United States Patent [19]

Figari

[11] 3,924,353
[45] Dec. 9, 1975

[54] METHOD AND APPARATUS FOR ENRICHING IRRIGATION WATER

[76] Inventor: Jorge Galvez Figari, Capitan Haya, 3 - 5, Madrid, Spain

[22] Filed: Nov. 14, 1974

[21] Appl. No.: 523,939

Related U.S. Application Data

[63] Continuation-in-part of Ser. No. 298,179, Oct. 16, 1972, abandoned, and a continuation-in-part of Ser. No. 298,180, Oct. 16, 1972, abandoned.

[30] Foreign Application Priority Data

Nov. 18, 1971  Spain .................................. 397151

[52] U.S. Cl. ............................. 47/1; 61/12; 252/316
[51] Int. Cl.² ......................................... A01C 23/04
[58] Field of Search ................................ 47/1, 1.2; 61/12–13; 252/316

[56] References Cited
UNITED STATES PATENTS

| | | | |
|---|---|---|---|
| 1,173,534 | 2/1916 | Ryan | 47/1 |
| 2,908,111 | 10/1959 | Hazen et al. | 47/1 |
| 2,909,002 | 10/1959 | Hendry | 47/1 |
| 2,983,075 | 5/1961 | Mizusawa | 47/1 |
| 3,200,539 | 8/1965 | Kelly | 47/1 |
| 3,455,054 | 7/1969 | Tibbals | 47/1 |

Primary Examiner—robert E. Bagwill
Attorney, Agent, or Firm—Browne, Beveridge, DeGrandi & Kline

[57] ABSTRACT

A method and apparatus for enriching irrigation water. A source of resin is introduced into irrigation water which has been separated from a main channel. Compressed air, enriched with nitrogen, is pressure-injected into the water to form resinous bubbles, which bubbles are then reduced in size to form a foam. Plant and soil nutrients are fed from a hopper onto the bubbles and adhere thereto, the bubbles then being re-introduced into the irrigation waters in order to be transmitted thereby to soil and plants being irrigated. Solvents may thereafter be added to the irrigation water to facilitate penetration of the nutrients into the land.

7 Claims, 10 Drawing Figures

METHOD AND APPARATUS FOR ENRICHING IRRIGATION WATER

This invention is a continuation-in-part of U.S. Patent application Ser. No. 298,179, filed Oct. 16, 1972, and also a continuation-in-part of U.S. Patent application Ser. No. 298,180, filed Oct. 16, 1972 (both now abandoned). The disclosures and specifications of both of these prior applications are relied upon and are hereby incorporated by reference.

BACKGROUND OF THE INVENTION

The present application concerns irrigation and fertilization of soil and plants, and more particularly an apparatus for forming soil-enriching nutrients and a method for forming soil-enriching nutrients and transmitting the nutrients to irrigated land.

It is generally known that for a correct, economical and high agricultural yield, it is necessary to supply the soil with a series of substances and elements, manures or fertilizers, which repeated harvests deplete. Said material constitutes a minimum part of the production of the soil, while the greater part is supplied by the air, water and solar energy. Also, in spite of the minimum quantity that is required, the lack of any of those substances can render the growth of plants impossible.

Plants take carbon, oxygen and hydrogen from the air and water; while from the soil they absorb relatively large quantities of nitrogen, phosphorus, potassium, sulfur, calcium, manganese, magnesium and large quantities of sodium in certain kinds of crops. The elements that plants take from the soil in lesser quantities include boron, iron, zinc, copper and molybdenum. However, some plants are benefited by extremely small quantities of other elements in addition to the ones already mentioned.

Even when the quantity required of the mentioned elements is extremely small, the lack of any of them can restrict the development of the plant. While the soils become more fertile, frequently it becomes necessary to add a certain quantity of these nutritive elements to keep the balance with the ever-greater yields. It should not be forgotten that plants need nutrients in the beginning in sufficient quantities and in a proper balance so that their growth and development may be normal.

Nitrogen is an essential element for plant development and life. It accounts for from 2 to 4% of the plants' dry weight and is a basic part of their proteins and chlorophyll, thereby participating fundamentally in the formation of new cells.

With the exception of elements characteristic of certain types of crops, the main elements that man should supply the soil with to compensate for its deficiencies are: nitrogen, phosphorous, potassium and, at times, calcium.

Supplying the materials that the plants feed on, can be done through the use of:

1. - Fertilizers, including chemical and organic fertilizers,
2. - Dung, vegetable remians, animal wastes and human excrement, which also serve to add organic material to the soil.
3. - Green manure, consisting of plants cultivated expressly to add organic materials to the soil, improve its structure and constitute a constant source of nutrients.
4. - Supplements or materials which, like lime and gypsum, are mainly used to correct unfavorable soil conditions, such as a high degree of acidity or heavy concentrations of certain soluble salts.

One subject of this invention is a cell or apparatus for enriching irrigation water, capable of being associated with others of the same type thus forming an irrigation-water treatment module. Its purpose is to add to the irrigation water, in accordance with the type of agriculture lands irrigated, their quality and the kind of crops, the mineral salts necessary to complement the principal nutrients of the plants, in sufficient quantities and proper balance for the complete and normal growth and development of the plants.

Essentially, the recommended improvements consist of the addition of a vegetable resin such as, but not limited to, resins obtained from the family of pine trees to the water which, once introduced into the cell or apparatus in question, will receive a stream of nitrogen-charged air with the consequent formation of bubbles which will undergo a process of trituration and centrifugal spinning in the cell. The bubbles thus triturated and coated by a film of homogenized begetable resin in the water flow, will form a thick layer of foam in the upper area of the cell. This layer of foam will receive the addition of suitable mineral substances by means of the discharge from a hopper for storage, grinding and gradation of the mineral substances, in this way permitting the particles of these mineral salts to adhere to the bubbles coated by the vegetable resin. When the layer of bubbles reaches a certain volume determined by the capacity of the cells, they pass on to a channel of water, flowing from the treatment module and carrying with them the portions of each and every one of the mineral substances and salts adhering to the bubbles in predetermined amounts established in accordance with the soil factors, discussed infra, of the land to be irrigated.

The separation of the water supply to be enriched can be effected directly to the irrigation canals of the basin, or by separating a certain percentage of the volume supplied by the dam, then enriching it sufficiently so that once returned to the original channel and mixed with its flow, the percentage of nutritive substances of the entire supply will be that required by the products to be irrigated.

An important factor in this treatment process is the location of the water-supply feeding plant in relation to the sites of mineral extraction or nutritive materials, inasmuch as their transportation is a fundamental cost factor in the complete process and is one of the determining factors in choosing the type of crop that should be raised in the hydrographical basin. This is because the plant species to be cultivated require a specific ration of certain products different from others, and the adequate products whose exploitation could be profitable could exist in the vicinity of the enriching plant to be installed.

The determination and supplies of the nutritive mineral products in the vicinity of the plant to be installed constitute a fundamental factor for the determination of:

a. Type of crop.
b. Exact location of the enriching plant, size of same and therefore, extension of the cultivated area.
c. Determination of an intensive or extensive cultivation.
d. Determination of the type of plant needed, since the following factors must be taken into consideration: hardness, solubility and suspension capacity (considering the velocity and slope of the stream) of nutritive mineral substances.

e. Determination of irrigation system for maximum output of irrigation water.

Once the area of the hydrographical basin as well as the type of crop and irrigation system are determined, the determination of the type of plant which can be grown is not only concerned with the previous characteristics, but also in turn depends upon the hardness, solubility, and suspension capacity of the nutritive substances. Likewise, the type of land in the hydrographical basin is a decisive factor in the cultivation in the determination of the necessary nutritive substances. In addition, in the treatment process of the irrigation water, an addition in the treatment plant of an organic solvent, such as, but not limited to, the benzene-like components of the resins which evaporate when the resins solidified, may be necessary so that, by the solvents acting on the composition of the land, it gives the land a convenient hardness or softness, not only for a better and deeper distribution of the nutritive mineral substances that in every type of fertilization would be distributed superficially, but also for a better development of the feeding base of the plants which is constituted by their roots, thus achieving a greater growth of the plants and the possibility of a greater absorption of the nutritive substances.

Set forth below is a detailed description of the invention with reference made to the accompanying drawings which illustrate a preferred embodiment of the invention.

DETAILED DESCRIPTION OF THE INVENTION

Figure 1:
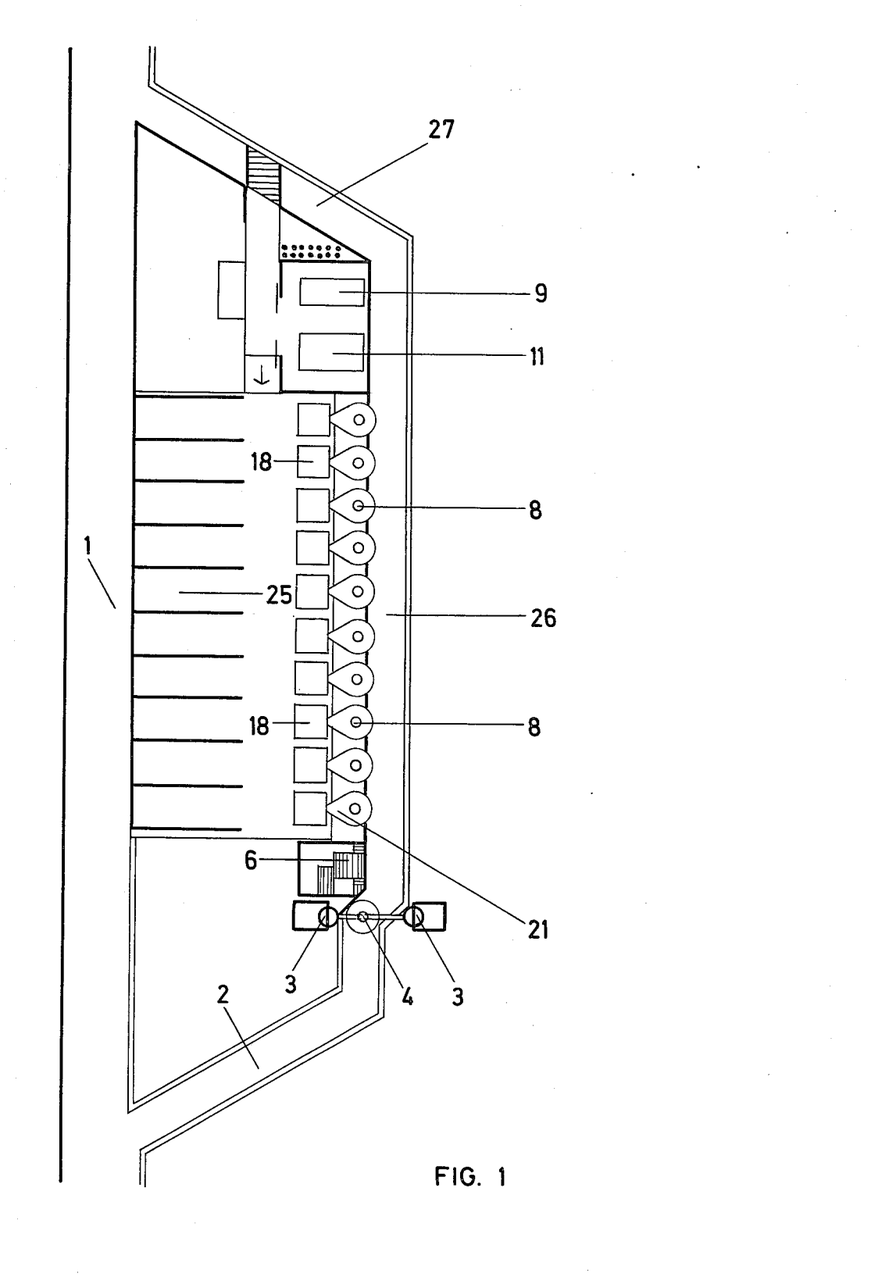
FIG. 1 is a diagrammatic illustration of the components of an irrigation-water treatment module.
Figure 2:
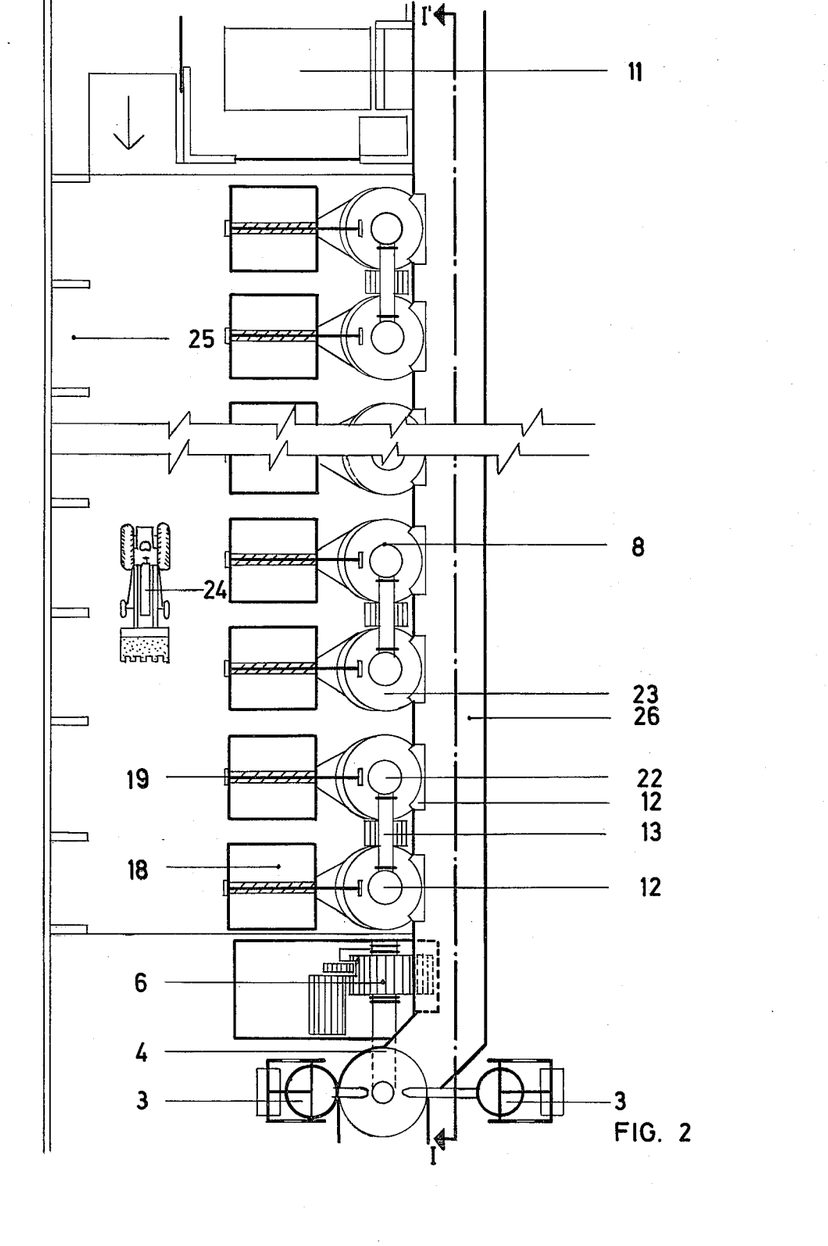
FIG. 2 is a partial enlarged view of FIG. 1.
Figure 3:
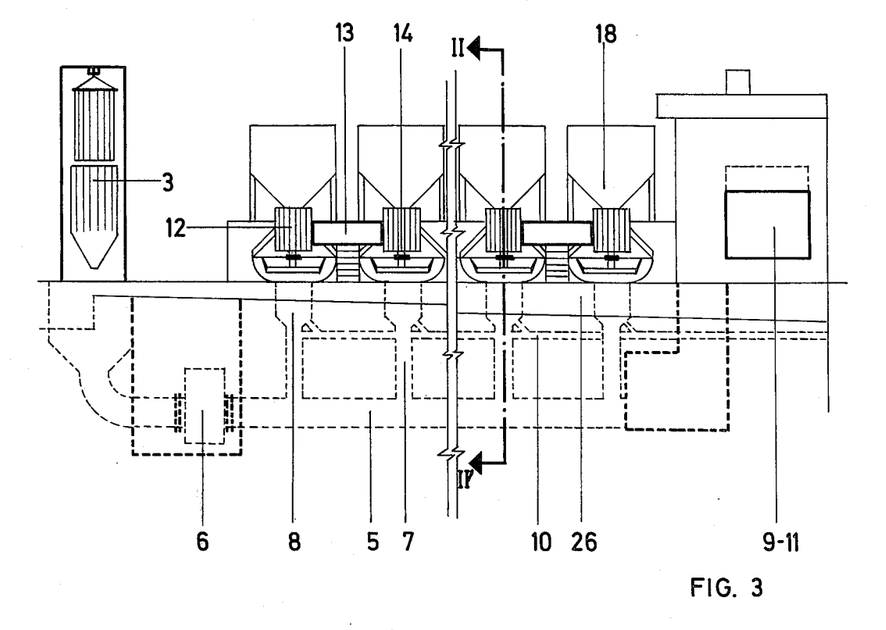
FIG. 3 is a cross-section of FIG. 2 taken along line I—I$^1$.
Figure 4:
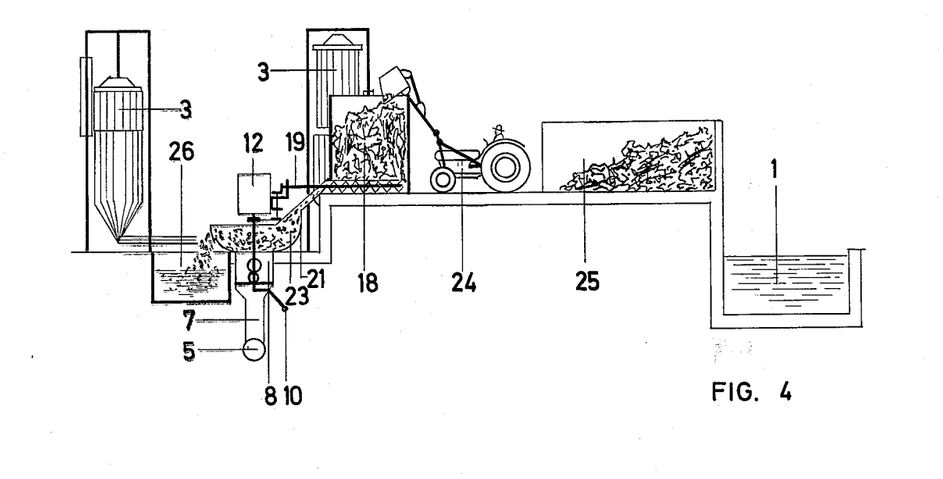
FIG. 4 is a cross-section view of an irrigation-water treatment module.
Figure 5:
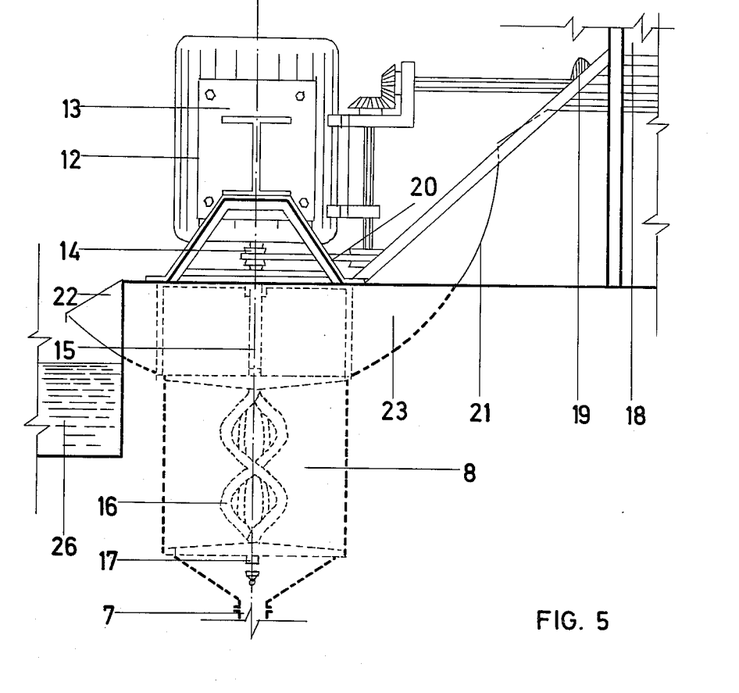
FIG. 5 is a cross-section view taken along line II—II$^1$ of FIG. 3.
Figure 6:
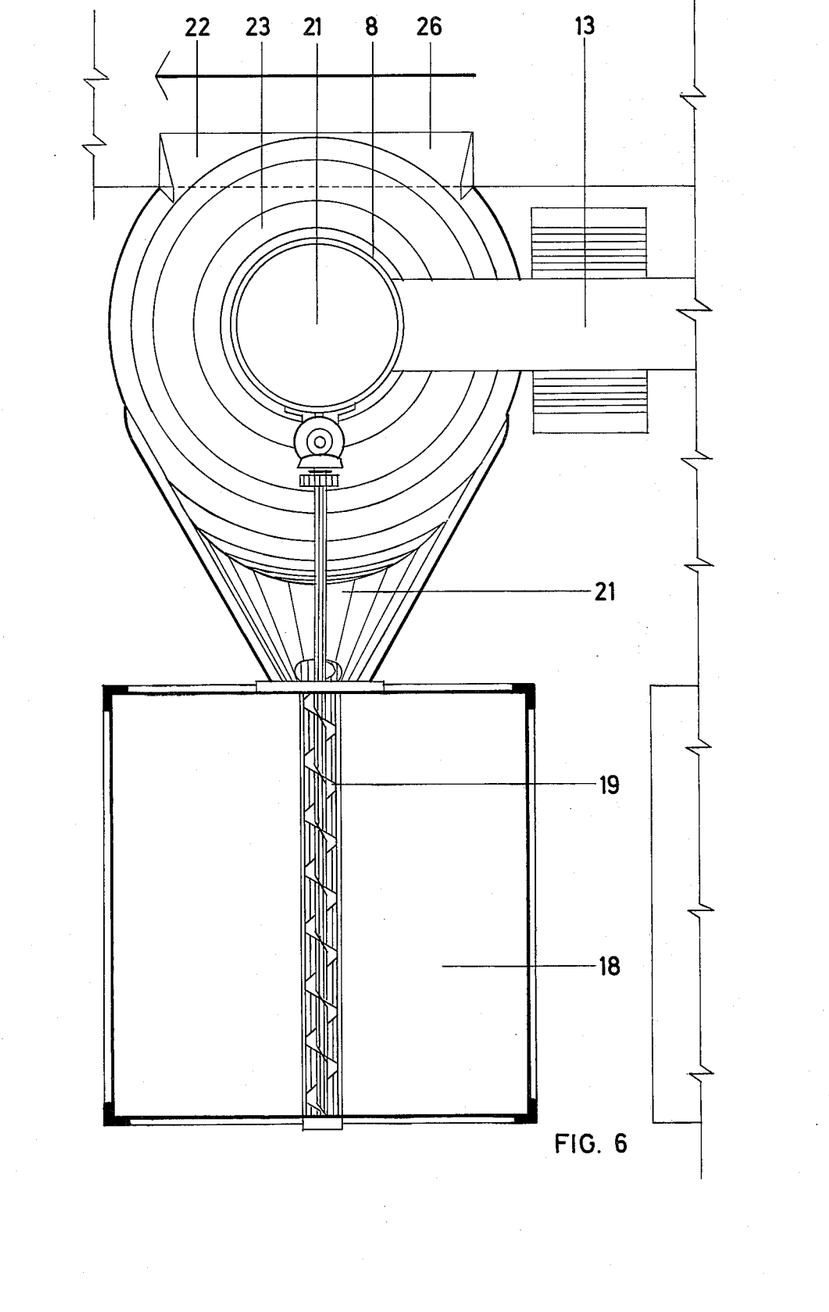
FIG. 6 is an overhead plan view of an enriching cell.

Turning now to a preferred embodiment as depicted in the drawings, a diverting channel 2 is provided from the channel of a river or main channel 1 for part of the flow of the main channel 1. Between the main channel 1 and the diverting channel 2 is located the treatment apparatus for the flow of water of channel 2. These diverted waters will later be returned to main channel 1, enriched and prepared for irrigation.

A syphon 4, situated at the entrance of the treatment unit under diverting channel 2, withdraws a portion of the flow in diverting channel 2. To this withdrawn flow, the vegetable resin is added through a system of gravity-operated pistons 3. This resinous water is then pumped by a pump 6 through a series of subterranean distribution passages 5.

A series of enriching cells or apparatuses 8 is provided within the treatment apparatus, the cells communicating with distribution passages 5 through their respective passages 7. Also communicating with cells 8 is a second series of subterranean passages 10 which can supply a stream of pressure-injected air enriched with a suitable portion of nitrogen, and generated by compressor 9. This stream of air entering cells 8 produces a series of bubbles coated with the vegetable resins and also forces the water upward within cells 8.

A general source of energy 11, preferably consisting of an electrical energy transformer, supplies necessary power to an electric motor 12 which is situated in the upper part of each one of cells 8 by means of a supporting structure 13. Electric motors 12 are connected through a flexible joint 14 to the upper end of a vertical axle of a rotating element 15 located on the inside of the cells 8. Rotating element 15 is formed by helical vane 16 which make up an ascending spiral. The lower end of the axle of the rotating element 15 turns on bushings 17.

Through the rotation of element 15 by electric motor 12, the helical vanes 16 are made to triturate and centrifuge the bubbles originating from the stream of air injected in cells 8 through subterranean passage 10, thereby reducing them to a suitable and intended size. The thus triturated bubbles, coated by a film of homogeneous vegetable resin, will form a thick layer of foam in the upper part of cells 8.

To coat the bubbles with a suitable mineral substance, pulverized mineral salts and the like are deposited in hopper 18 after being suitably ground to size by a conventional ball mill (not shown). The mineral substances are then introduced in a predetermined quantity by the pitch and turning of an endless screw 19 situated adjacent hoppers 18. Endless screw 19 is turned by electric motor 12 acting through a pulley 20. The mineral substances fall into a chute 21 and are drawn into cell 8 by gravity, tracing an acceleration curve whose end is tangential to the plane formed by the layers of bubbles, thereby allowing the mineral substances to adhere to all the bubbles by taking them in turn.

When the layer of bubbles reaches the proper height and volume within cells 8, they leave cells 8 by a lip 22 formed at the upper part of the greatest diameter of cells 8. This widened area 23 of cells 8 curves outward to provide for an expansion of a greater volume of bubbles due to the trituration thereof.

To fill hoppers 18 with a suitable mineral substance, loading system 24 is employed. The mineral substances are stored in tanks or hopper 25 for this purpose. Therefore, a continuous transmission of the mineral substances to the bubbles can be effected without having to interrupt the water-enriching process.

The bubbles, coated by the film of vegetable resin, which carries the adhering particles of the mineral substances, float in the inside of cells 8 on a pool of water originated by the intake flow in distribution passage 5. After passing from cells 8 over lip 22, the bubbles fall in turn upon a channel of water 26, which is the remaining water in channel 2 after syphon 4 has withdrawn a portion thereof for transmission to cells 8. Channel 26 receives the successive discharges of all cells 8 located in a treatment module and with them the proportions of each and every mineral salt added to the bubbles in cells 8 in predetermined proportions.

The enriched bubbles then float from channel 26 through a delivery channel 27 to return to the original river or main channel 1, continuing through it to lands under cultivation which are to be subjected by this procedure to treatment of mineralized biological improvement.

Figure 7:
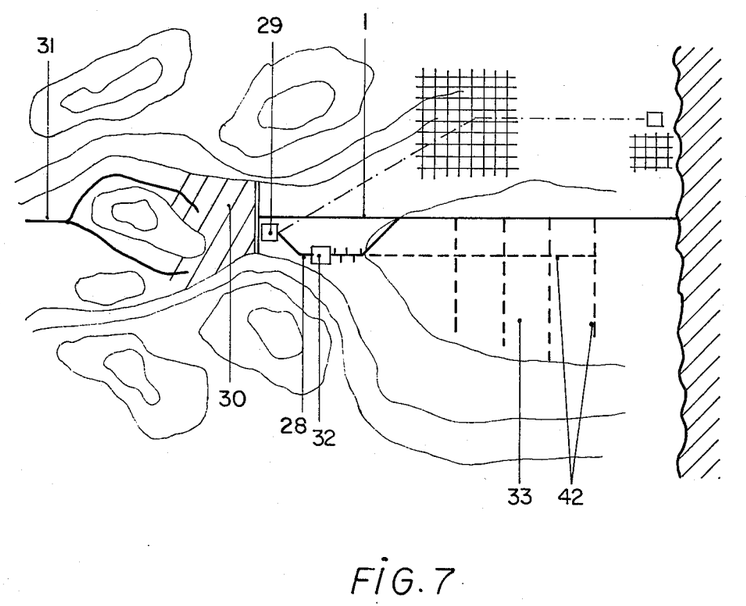
FIG. 7 is an overhead view of an entire irrigational system of a hydrographical basin.
Figure 8:
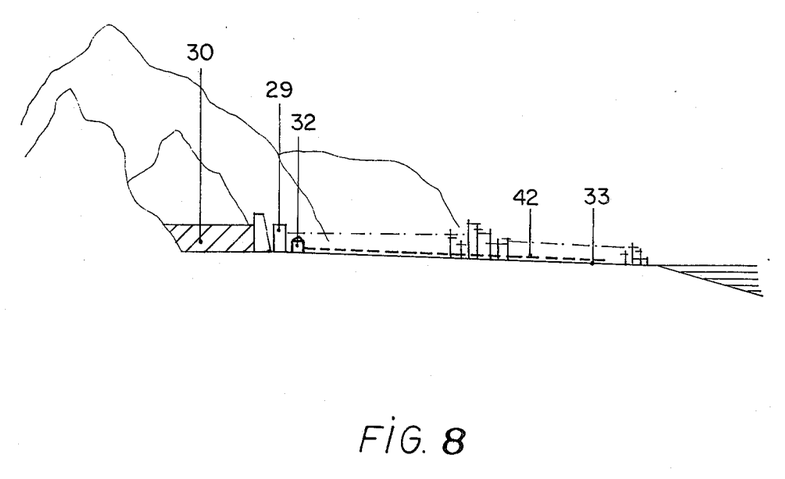
FIG. 8 is a cross-sectional view of a hydrographical basin.

Turning now to FIG. 7 which shows the aforedescribed treatment plant in combination with an irrigation system, water is shown diverted through a channel 28 from a river or main channel 1, once the river has passed through generating station 29 of a dam 30, which dam contains the impounded waters 31.

Diverted waters in channel 28 can serve an irrigation system whose water will be used entirely for this purpose, or an irrigation system which eventually returns a portion of its water to the river 1 after irrigation. In either instance, the irrigation water is first enriched in water treatment plant 32 as previously described.

Figure 9:
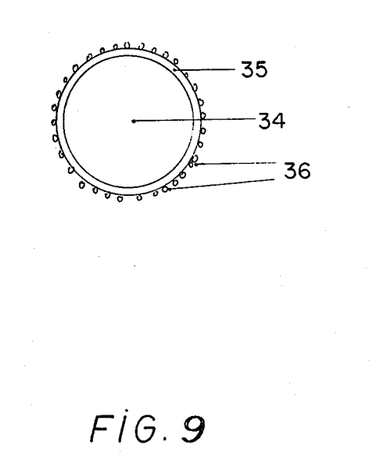
FIG. 9 is a sectional view of an air bubble with coatings according to the invention.

The bubble produced is shown in FIG. 9. The bubble, shown at 34, consists of nitrogen-charged air contained within a shell of vegetable resin 35 with a multiplicity of particles 10 adhering to the vegetable resin, which particles consist of mineral substances and salts as previously described.

Figure 10:
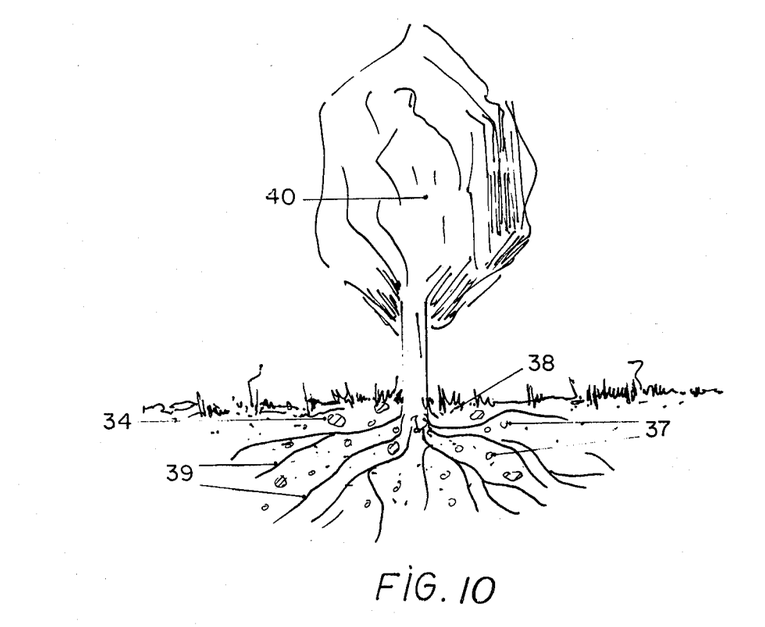
FIG. 10 is a sectional view of a plant showing the action of the solvent and the nutrient materials on the base feeding and roots.

When the bubbles leave water treatment plant 32, they will travel to irrigation channels 42, arriving at the porous earth 38 about and around plants 40, encrusting themselves in the soil and proceeding to complete the process of fertilization.

Later, in water treatment plant 32, a solvent may be added to the water to act upon the hardness and plasticity of the land 38 to facilitate the penetration of the nutritive mineral substances during the growth of root 39 of plants 40. Solvent-laden water is graphically depicted at 37 in FIG. 10. The composition of the solvent is such that it does not alter the resinous composition of the bubble, and may consist of, for example, the benzene component of the resin which has been lost when the bubbles have come into contact with the air and hardened.

Since the land under treatment was previously plowed, the bubbles will penetrate into pores in the land produced by the effect of the plow as the water sinks in. Once covered by a new plowing, the bubbles will decompose and thereby create a nitrogenous bacteria culture and will also deposit in the soil the mineral substances added to them during the bubble-producing process which had adhered to the resinous film.

Various changes may be made to the forms of the invention herein shown and described without departing from the spirit of the invention or the scope of the following claims.

I claim:

1. A system for enriching irrigation waters with plant and soil nutrients, comprising,
   a first intake channel for diverting water from a main irrigation channel,
   a water intake syphon located beneath said first channel, said syphon withdrawing a portion of the water from said first channel,
   a source of vegetable resins,
   means to effect a flow of resins from said source into said syphon,
   at least one enriching cell,
   means interconnecting said cell with said syphon to provide a source of resin-containing water to said cell,
   an air compressor, said compressor equipped with passages leading to said cell to allow pressure-injected air to enter said cell and cause a plurality of bubbles therewithin,
   a motor, said motor attached to a vertical axle extending into said cell, said axle equipped with helical vanes which centrifuge said bubbles to increase the number and reduce the size thereof, the bubbles so centrifuged forming a foam on the surface of the water in said cell,
   a supply of soil nutrients,
   means to transfer a portion of said supply to said whereby the soil nutrients adhere to the vegetable resins contained in said foam, and
   a second delivery channel, said second channel delivering the nutrient-adherent foam to an irrigation system.

2. The system of claim 1 including a pump within said syphon to effect transfer of water from said syphon to said cell.

3. The system of claim 1 wherein said supply of nutrients comprises a hopper and said means to transfer comprises an endless screw conveyor at the bottom of said hopper and a chute to provide a passage of the nutrients to said cell.

4. The system of claim 1 wherein said motor operates said screw conveyor.

5. The system of claim 3 including a ball mill within said hopper to reduce said nutrients to a microscopic state of granularity.

6. A process of irrigating land and crops, comprising:
   a. diverting a portion of the flow of water from an irrigation channel to a divergent channel,
   b. withdrawing a portion of the water from said divergent channel,
   c. charging said withdrawn portion with vegetable resins,
   d. introducing pressure-injected air into said withdrawn portion to cause bubbles in at least a portion of said vegetable resins,
   e. introducing nutrients to said bubbles which adhere thereon, forming a fertilizer carrier, and
   f. returning said carrier to irrigation waters to irrigate land.

7. The process of claim 6 including a final step of adding a solvent to said irrigation waters capable of acting upon the hardness of the soil to be irrigated and chemically non-reactive with the vegetable resins.

* * * * *